United States Patent
Jin (10) Patent No.: US 10,916,160 B2
(45) Date of Patent: *Feb. 9, 2021

(54) PROCESSING ELECTRONIC PAYMENTS USING AT LEAST TWO PAYMENT TOOLS FOR A TRANSACTION

(71) Applicant: Advanced New Technologies Co., Ltd., George Town (KY)

(72) Inventor: Jianwei Jin, Hangzhou (CN)

(73) Assignee: Advanced New Technologies Co., Ltd.

( * ) Notice: Subject to any disclaimer, the term of this patent is extended or adjusted under 35 U.S.C. 154(b) by 13 days.

This patent is subject to a terminal disclaimer.

(21) Appl. No.: 16/400,240

(22) Filed: May 1, 2019

(65) Prior Publication Data
US 2019/0259306 A1 Aug. 22, 2019

Related U.S. Application Data

(63) Continuation of application No. 14/752,565, filed on Jun. 26, 2015, now Pat. No. 10,332,427.

(30) Foreign Application Priority Data

Jun. 30, 2014 (CN) .......................... 2014 1 0306988

(51) Int. Cl.
*G06Q 40/00* (2012.01)
*G09C 1/00* (2006.01)
(Continued)

(52) U.S. Cl.
CPC ............... *G09C 1/00* (2013.01); *G06Q 20/02* (2013.01); *G06Q 20/227* (2013.01); *G06Q 20/40* (2013.01); *G06Q 20/4037* (2013.01)

(58) Field of Classification Search
USPC ........ 705/39, 40, 37, 38, 26.4, 27.1; 463/40; 700/236, 245; 709/217, 218; 706/25, 45;
(Continued)

(56) References Cited

U.S. PATENT DOCUMENTS 5,999,625 A * 12/1999 Bellare .................. G06Q 20/06
 705/39
6,029,150 A * 2/2000 Kravitz .................. G06Q 20/02
 705/39
(Continued)

FOREIGN PATENT DOCUMENTS

EP 2444926 A1 4/2012
WO 2005059800 A1 6/2005

OTHER PUBLICATIONS

Integration of new electronic payment systems into B2C internet commerce; 2011 International Conference on Collaboration Technologies and Systems (CTS) (pp. 484-491); May 1, 2011; Abdellaoui, R.; Pasquet, M. (Year: 2011).*
(Continued)

*Primary Examiner* — Tien C Nguyen
(74) *Attorney, Agent, or Firm* — Van Pelt, Yi & James LLP (57) ABSTRACT

Embodiments of the present application relate to a method, apparatus, and system for operating an account. The method includes receiving a selection of a plurality of payment tools from a terminal, determining a plurality of payment servers corresponding to respective ones of the plurality of payment tools based on the received selection, sending one or more funds deduction commands to the plurality of payment servers associated with corresponding ones of the selected payment tools, receiving one or more notifications of successful funds deduction from any of the plurality of payment servers associated with the selected payment tools, and in response to receiving the one or more notifications of successful funds deduction, updating funds data in a third party payment account.

16 Claims, 6 Drawing Sheets

(51) Int. Cl.
*G06Q 20/02* (2012.01)
*G06Q 20/22* (2012.01)
*G06Q 20/40* (2012.01)

(58) Field of Classification Search
USPC .......... 318/611; 606/130; 715/708; 235/375, 235/380, 379
See application file for complete search history.

(56) References Cited

U.S. PATENT DOCUMENTS

| | | | |
|---|---|---|---|
| 6,685,088 B1 | 2/2004 | Royer | |
| 7,184,980 B2* | 2/2007 | Allen-Rouman | G06Q 20/02 705/35 |
| 7,627,524 B2* | 12/2009 | Bennett | G06Q 20/10 705/35 |
| 7,925,513 B2* | 4/2011 | Chao | G06Q 30/0613 705/7.11 |
| 8,041,338 B2 | 10/2011 | Chen | |
| 8,352,323 B2 | 1/2013 | Fisher | |
| 8,412,631 B2 | 4/2013 | Crofts | |
| 8,423,457 B1 | 4/2013 | Schattauer | |
| 8,577,804 B1 | 11/2013 | Bacastow | |
| 8,725,575 B2 | 5/2014 | Fisher | |
| 8,799,084 B2* | 8/2014 | Florek | G06Q 20/20 705/16 |
| 8,978,975 B2* | 3/2015 | Barnett | H04L 63/083 235/380 |
| 9,159,061 B2 | 10/2015 | Bacastow | |
| 9,483,761 B2* | 11/2016 | Brendell | G06Q 20/382 |
| 9,922,326 B2* | 3/2018 | Alexander, IV | G06Q 20/40 |
| 2002/0103753 A1 | 8/2002 | Schimmel | |
| 2003/0055738 A1* | 3/2003 | Alie | G06Q 30/0601 705/26.1 |
| 2003/0155416 A1 | 8/2003 | MacKlin | |
| 2003/0200107 A1* | 10/2003 | Allen | G06Q 10/10 705/35 |
| 2005/0060260 A1 | 3/2005 | Masuda | |
| 2005/0246289 A1* | 11/2005 | Alexander, IV | G06Q 20/40 705/67 |
| 2005/0289051 A1* | 12/2005 | Allin | G06Q 10/103 705/40 |
| 2006/0026073 A1* | 2/2006 | Kenny, Jr. | G06Q 30/0226 705/16 |
| 2007/0005496 A1* | 1/2007 | Cataline | G06Q 20/10 705/40 |
| 2007/0152035 A1* | 7/2007 | Adams | G06Q 20/105 235/380 |
| 2008/0078831 A1 | 4/2008 | Johnson | |
| 2008/0208681 A1 | 8/2008 | Hammad | |
| 2010/0203870 A1* | 8/2010 | Hubinak | G06Q 20/3829 455/414.1 |
| 2010/0211507 A1 | 8/2010 | Aabye | |
| 2011/0105183 A1 | 5/2011 | Hsiao | |
| 2011/0251922 A1 | 10/2011 | Cavagnaro | |
| 2013/0031202 A1* | 1/2013 | Mick | G06F 3/00 709/217 |
| 2013/0041813 A1 | 2/2013 | Nezu | |
| 2013/0041830 A1 | 2/2013 | Singh | |
| 2013/0346305 A1 | 12/2013 | Mendes | |
| 2014/0006194 A1 | 1/2014 | Xie | |
| 2014/0058936 A1 | 2/2014 | Ren | |
| 2014/0074704 A1 | 3/2014 | White | |
| 2014/0244494 A1 | 8/2014 | Davis | |
| 2014/0249993 A1 | 9/2014 | Venkatraman | |
| 2015/0248661 A1 | 9/2015 | Pontious | |
| 2015/0310420 A1 | 10/2015 | Fisher | |

OTHER PUBLICATIONS m-Payment systems: Technologies and business models; 2014 Euro Med Telco Conference (EMTC) (pp. 1-6); Jan. 23, 2015; Nov. 1, 2014; Dec. 23, 2014; Alessandro Vizzarri; Francesco Vatalaro. (Year: 2014).*

* cited by examiner

FIG. 1

(RELATED ART)

PROCESSING ELECTRONIC PAYMENTS USING AT LEAST TWO PAYMENT TOOLS FOR A TRANSACTION

CROSS REFERENCE TO OTHER APPLICATIONS

This application is a continuation of co-pending U.S. patent application Ser. No. 14/752,565, entitled PROCESSING ELECTRONIC PAYMENTS USING AT LEAST TWO PAYMENT TOOLS FOR A TRANSACTION filed Jun. 26, 2015 which is incorporated herein by reference for all purposes, which claims priority to People's Republic of China Patent Application No. 201410306988.4 entitled A METHOD AND A DEVICE FOR OPERATING ELECTRONIC ACCOUNTS, filed Jun. 30, 2014 which is incorporated herein by reference for all purposes.

BACKGROUND OF THE INVENTION

The emergence and rapid spread of the Internet has resulted in more and more everyday activities being carried out by online Internet operations. For example, more and more transactions can be completed on Internet-based online platforms. Transactions that can generally be completed on Internet-based online platforms include the buying and selling of merchandise and stocks.

Figure 1:
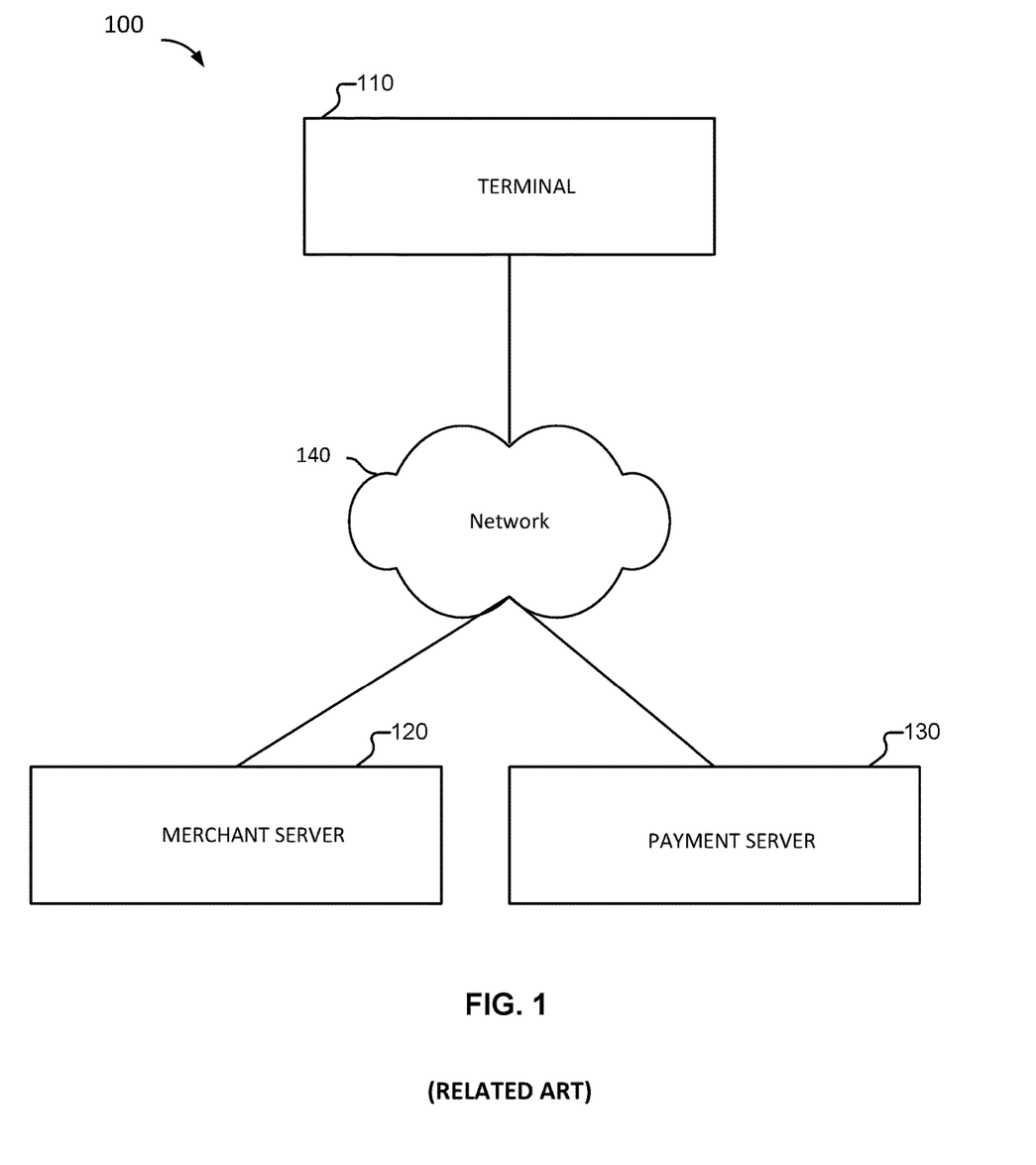
FIG. 1 is a diagram of a system that assists a user in completing online shopping according to some related art.

FIG. 1 is a diagram of a system that assists a user in completing online shopping according to some related art.

Referring to FIG. 1, a system 100 that assists a user in completing online shopping includes a terminal 110, a merchant server 120, a payment server 130, and a network 140. The terminal 110 is generally a user terminal that can be an electronic device such as a computer, a mobile phone, a tablet, or other computing device. The merchant server 120 is generally a server for a shopping website (e.g., a server that hosts an e-commerce website), and the payment server 130 is generally a banking server or another server that has the authority to operate electronic accounts. The terminal 110, the merchant server 120, and the payment server 130 can communicate over a network 140 such as the Internet.

According to some related art, a user can generally use multiple payment tools associated with different funds-providing institutions to complete payment of an electronic order in multiple operations. For example, a user can use the balances on two bank cards linked to a merchant account to pay for an order. In the event that an order is paid for using two different accounts, at payment time (e.g., at the checkout), the order is paid by dividing the order into two successive sub-orders. The user first uses the user terminal to set the payment amount information for a first bank card. The merchant server sends a deduction request based on the set first bank card payment amount information to the payment server for the first bank card so as to request payment for the first sub-order. After the deduction is made successfully from the first bank card, the user then uses the user terminal to set the payment amount information for a second bank card. The merchant server sends a deduction request based on the set second bank card payment amount information to the payment server for the second bank card so as to request payment for the second sub-order. After the deduction is made successfully from the second bank card, the entire order is successfully and finally paid.

Accordingly, the use of multiple payment tools to perform one electronic order requires that the user acquire payment tool information multiple times from a user terminal. As a result, transaction efficiency is lower. Therefore, there is a need for a method, device, and system for providing more efficient payment using multiple payment tools.

BRIEF DESCRIPTION OF THE DRAWINGS

Various embodiments of the invention are disclosed in the following detailed description and the accompanying drawings.

The drawings described here are intended to further the understanding of the present application and form a part of this application. The illustrative embodiments of the present application and the descriptions thereof are intended to explain this application and do not constitute inappropriate limitation of the present application. Among the drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a terminal generally refers to a device used (e.g., by a user) within a network system and used to communicate with one or more servers. According to various embodiments of the present disclosure, a terminal may include communication functionality. For example, a terminal may be a smart phone, a tablet computer, a mobile phone, a video phone, an e-book reader, a desktop Personal Computer (PC), a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), or the like.

According to some embodiments of the present disclosure, a terminal includes a smart home appliance with communication functionality. A smart home appliance can be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like.

According to various embodiments of the present disclosure, a terminal can be any combination of the foregoing terminals. In addition, it will be apparent to one having ordinary skill in the art that a terminal according to various embodiments of the present disclosure is not limited to the foregoing terminal.

Various embodiments of the present disclosure include a method, a client terminal, and a server for operating electronic accounts.

Figure 2A:
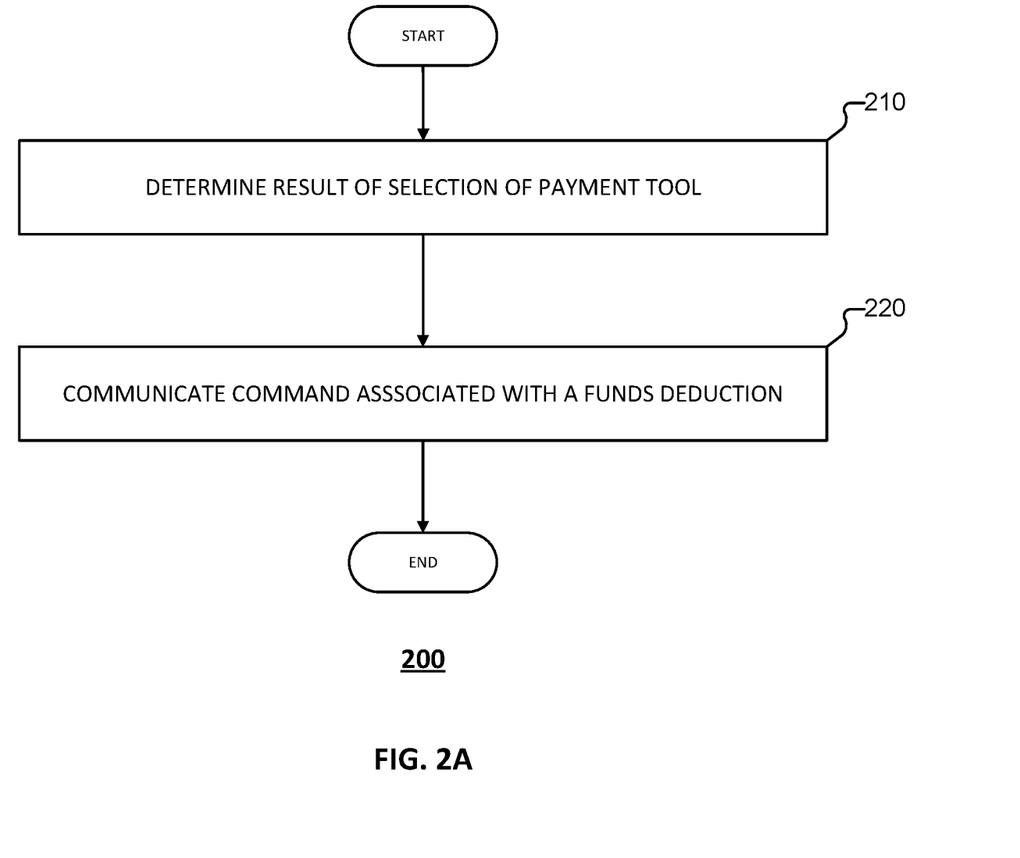
FIG. 2A is a flowchart of a method for operating electronic accounts according to various embodiments of the present application.

FIG. 2A is a flowchart of a method for operating electronic accounts according to various embodiments of the present application.

Referring to FIG. 2A, a process 200 for operating electronic accounts is provided. Process 200 can be implemented using device 400 of FIG. 4.

At 210, a selection of a payment tool is received. In the event that a selection of a payment tool is received, a result of a selection of a payment tool can be determined. A user can input to a terminal (e.g., a user terminal) a selection of a payment tool (e.g., a credit card account, a bank account, etc.). The user can input the selection of the payment tool to an interface provided by the terminal. The terminal can send an indication of the selection of the payment tool to a server. The server determines the result of the selection of the payment tool based on the indication of the selection of the payment tool. The selection of the payment tool can correspond to a selection of a payment tool in connection with a single electronic order.

In some embodiments, the payment tool selection result information includes information on at least two payment tools. For example, the payment tool selection result information provides an indication of at least two payment tools that the user wants to use in connection with the electronic order.

In the event that a selection of a payment tool is received, a plurality of payment servers corresponding to respective ones of the plurality of payment tools can be determined. For example, a database or table storing mappings of payment tools and payment servers can be queried to determine the plurality of payment servers corresponding to respective ones of the plurality of payment tools.

At 220, a command associated with a funds deduction is communicated. The server can send a command associated with the funds deduction to a respective payment server associated with a corresponding payment tool. The server uses the result of the selection of a payment tool as a basis for sending the funds deduction command to the payment server for each payment tool.

In the event that the selection of the payment tool includes selection of a first payment tool and a second payment tool, a first command associated with a first funds deduction is communicated to a first payment server associated with the first payment tool and a second command associated with a second funds deduction to a second payment server associated with the second payment tool. For example, if the total amount of the transaction is $100, and two credit cards A and B are selected as payment tools, where $40 is to be paid by credit card A and $60 is to be paid by credit card B, then a first funds deduction command of $40 is sent to a first payment server associated with credit card A, and a second funds deduction command of $60 is sent to a second payment server associated with credit card B.

In various implementations, the first command and the second command can be the same. For example, a command can include information associated with a plurality of funds deductions corresponding to respective ones of the plurality of payment servers.

In embodiments described herein, the specific forms of the payment tools are not limited. A payment tool can correspond to various accounts at funds-providing institutions. For example, the payment tool can correspond to balances of accounts at various funds-providing institutions. As another example, the payment tool can correspond to additional values, such as points, coupons, rewards, or the like from the accounts of funds-providing institutions. The accounts at a funds-providing institution can include savings accounts, credit card accounts, fund accounts, stock accounts, security accounts, insurance accounts, mobile phone accounts, shopping website accounts, or the like.

In some embodiments, an account at a funds-providing institution is linked to a merchant account. In the event that an account at a funds-providing institution is linked to a merchant account, the balance and additional values of the account at the funds-providing institution can be used to pay electronic orders.

Figure 2B:
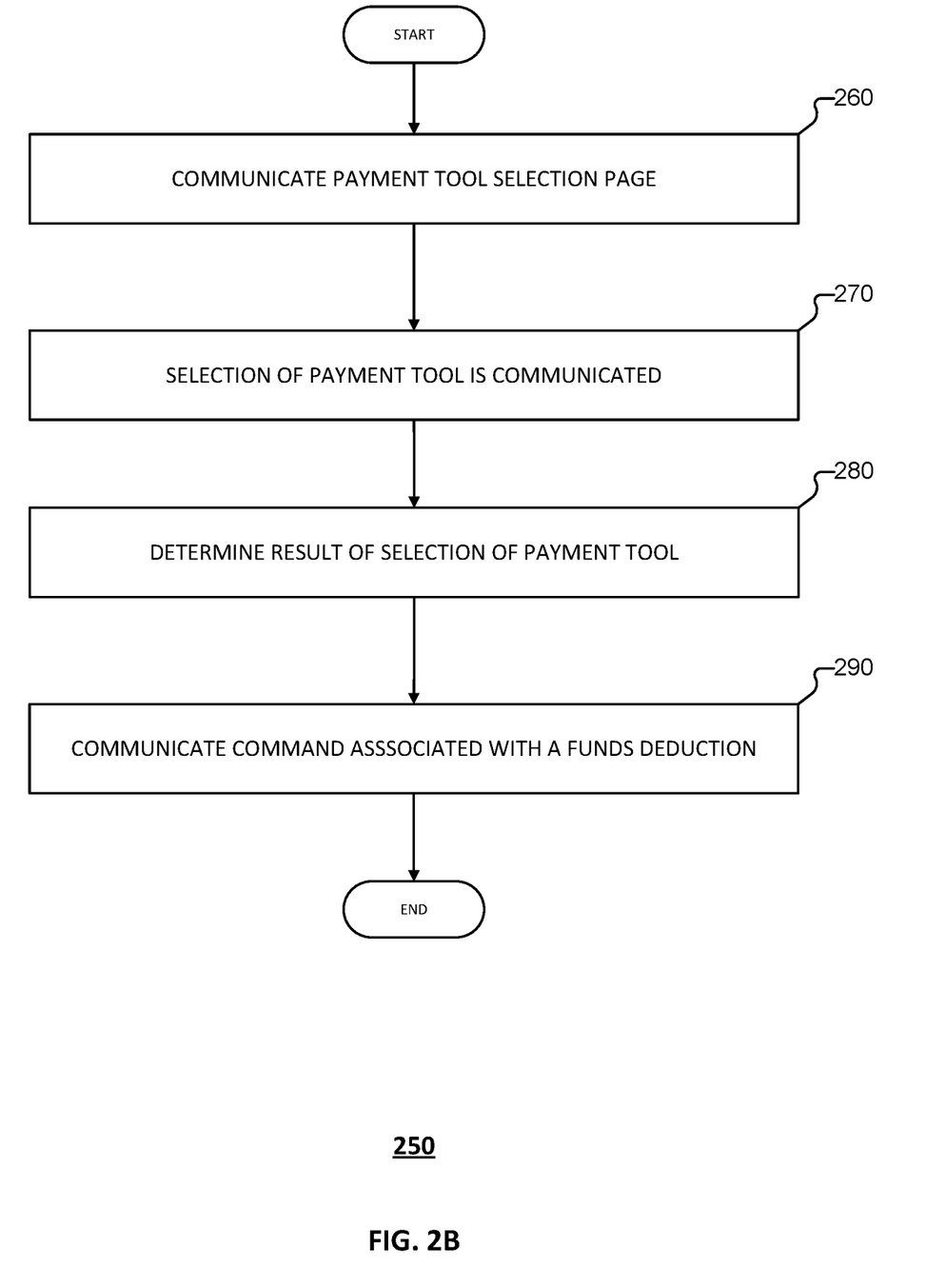
FIG. 2B is a flowchart of a method for operating electronic accounts according to various embodiments of the present application.

FIG. 2B is a flowchart of a method for operating electronic accounts according to various embodiments of the present application.

Referring to FIG. 2B, a process 250 for operating electronic accounts is provided. Process 250 can be implemented using device 400 of FIG. 4.

At 260, an input associated with a payment tool selection page is communicated. A terminal (e.g., user terminal) receives the input associated with the payment tool selection page. For example, the input can correspond to a request for a payment tool selection page.

In response to the terminal receiving the input associated with the payment tool selection page, the terminal can display a page that provides an indication of multiple payment tools linked to the merchant account. For example, the page providing the indication of the multiple payment tools enables the user to learn about the multiple payment tools linked to the merchant account. The user can select two or more payment tools from the page. For example, the terminal can provide an interface via which the user can input a selection of two or more payment tools (that a user wants to use in connection with a transaction such as a payment for a product or service).

At 270, a selection of a payment tool is communicated. In response to the input receiving a selection of a payment tool from a user, the terminal communicates the selection of the payment tool to a server. The server receives the selection of the payment tool from the terminal. The server can use the selection of the payment tool received from the terminal as a basis for determining the result of the selection of the payment tool.

The selection of the payment tool includes a selection of two or more payment tools selected by the user. Accordingly, the server determines the result of the selection of the payment tool such that the result of the selection of the payment tool includes information on two or more payment tools selected by the user.

At 280, a result of the selection of the payment tool is determined. 280 can correspond to 210 of process 200 of FIG. 2A.

At 290, a command associated with a funds deduction is communicated. 290 can correspond to 220 of process 200 of FIG. 2A.

In some embodiments, the result of the selection of the payment tool can include payment amount information corresponding to each payment tool. The payment amount information can be input to the terminal by the user. For example, the payment amount information can be input to an interface provided by the user. The user can input the payment amount information to a page displayed by the terminal. The page can be provided to the terminal by a server.

In some embodiments, the result of the selection of the payment tool includes information on at least two payment tools. For example, the selection of the payment tool by the user includes at least two payment tools.

In some embodiments, the payment tool payment amount information is randomly allocated and generated according to the total payment amount of the order. The payment tool payment amount information can be included in the commands associated with the funds deduction that are sent to the corresponding payment servers.

In some embodiments, at 220, commands associated with the funds deduction are simultaneously sent to the respective payment server associated with each selected payment tool. In some embodiments, at 220, commands associated with the funds deduction are sent sequentially according to a set command to the respective payment server associated with each selected payment tool.

In some embodiments, to ensure that the data in a single payment transaction is consistent for the terminal, in the event that a command associated with the funds deduction is communicated and a notification of successful funds deduction is sent by any one of the payment servers associated with the selected payment tools, the funds data in a third party payment account is updated (e.g., by the server). As an example, a user can have an account associated with the e-commerce website (e.g., be registered with an e-commerce website) and the user's account with the e-commerce website can be associated with a bank card that can be used to pay at least a part of the amount of a transaction. The funds data in a third party payment account is updated according to the notification of successful funds deduction sent by each one of the payment servers associated with the selected payment tools. In the event that the funds data in a third party payment account is updated, a notification of successful payment is sent (e.g., by the server) to the terminal.

In some embodiments, to ensure that the data in a single payment transaction is consistent for the terminal, in the event that a command associated with the funds deduction is communicated and upon receiving a notification of failed funds deduction sent from any one of the payment servers associated with a selected payment tool, a payment process rollback command is sent to the payment server of each of the selected payment tools. A notification of failed payment can be sent to the terminal.

In response to determining that the funds data of the third party payment account has been updated according to a notification of successful funds deduction sent by any one of the payment servers associated with a selected payment tool, the funds data of the third party payment account is restored.

Restoring the funds data of the third party payment account can include restoring the funds data of the third party payment account such that the funds data of the third party payment account after restoration is the same as the funds data of the third party payment account at a specific time (e.g., before funds deduction). The specific time can be any time before the initial sending of the command associated with a funds deduction to a server. The funds data of the third party payment account can be restored such that the balance of the third party payment account is the same as the balance of the third party payment account at the specific time.

In some embodiments, to ensure that the data in a single payment transaction is consistent for the terminal, in the event that a command associated with the funds deduction is communicated and in the event that any one of the payment servers sends back a notification of failed funds deduction within a threshold period of time, a payment process rollback command is sent to the payment server of each of the selected payment tools. The server can send the payment process rollback command to each of the payment servers associated with a selected payment tool in the event that the server receives a notification of failed funds deduction within the threshold period of time. Thereafter, the server can send a notification of failed payment to the terminal. The threshold period of time can be measured from the time at which the instruction to deduct the funds is communicated to the corresponding payment servers (e.g., the time at which the funds deduction command is communicated). A timer can be set in connection with the communication of the instruction to deduct the funds to the corresponding payment servers. For example, the timer can be configured with the threshold period of time.

In response to determining that the funds data of the third party payment account has been updated according to a notification of successful funds deduction sent by any one of the servers associated with one of the selected payment tools, the funds data of the third party payment account is restored.

The following example shows an implementation in which consistency of the data in a single payment transaction for the user terminal, the payment server, and the third party payment account is ensured.

The user chooses to use the balances of the bank card accounts of two banks to pay an electronic order. Assume that the payment amount for the order is $100. The first bank card account is set to pay $60, and the second bank card account is set to pay $40. Funds deduction commands are respectively sent (e.g., separately) to the payment servers of the two banks. In response to the payment server of the first bank sending a notification of successful deduction of $60, the funds data of the third payment account is correspondingly increased $60. In response to the payment server of the second bank sending a notification of successful deduction of $40, the funds data of the third payment account is correspondingly increased $40. After the payment transaction data is processed, a notification of successful payment is sent to the user terminal. The electronic order has been successfully paid.

In the event that a notification of failed funds deduction is sent from the payment server of any bank, a payment process rollback command is sent to the payment servers of the two banks in order to cause payment cancellation by the bank card accounts of both banks. If the funds data of the third party payment account has already been updated according to a notification of successful funds deduction sent back by any one of the servers, the funds data of the third party payment account is restored so that the funds data is the same as the funds data of the third party payment account at a specific time. For example, when the payment server of the first bank sends back a notification of successful funds deduction, the funds data of the third party payment account is updated: the funds data is correspondingly increased $60. Because the balance of the second bank card account is insufficient, the payment server of the second bank sends a notification of failed funds deduction. In response to receiving the notification of failed funds deduction, a payment process rollback command is sent to the payment servers of both banks in order to cause payment cancellation by the bank card accounts of both banks. For example, in response to receiving the payment process rollback command, the payment server of the corresponding bank can cancel the payment from the bank card account. In response to receiving the payment process rollback command, the bank card account of the first bank is reversed, or the payment server refunds $60. The bank card account of the second bank cancels payment. The funds data of the third party payment account decreases $60 and is restored so that the funds data of the third party payment account is the same as the funds data of the third party payment account at a specific time.

In some embodiments, the payment process rollback command is sent to the payment servers associated with the selected payment tools other than the payment server that sent the notification of failed funds deduction.

If any server fails to send back a notification of successful funds detection within a threshold time, the funds deduction can be deemed to have failed. Accordingly, in the event that any payment server associated with one of the selected payment tools fails to send a notification of successful funds detection within the threshold time, a payment process rollback command is sent to the payment servers of both banks in order to cause payment cancellation by the bank card accounts of both banks.

In some embodiments, the payment process rollback command comprises a reverse operation request command or a refund operation request command.

In some embodiments, the user selects two or more payment tools through a single payment operation. Accordingly, payment operating time is saved and the efficiency and convenience of payment is increased. After a payment deduction command is sent to the payment server of each payment tool, the payment server of each payment tool can process funds deduction in parallel. Accordingly, payment operating time is further enhanced and payment efficiency is further increased.

The executing entity for all the steps of process 200 or process 250 can be the same device, or a different device may serve as the executing entity for each step of process 200 or process 250. For example, 210 and 220 of process 200 can both be performed by a first device. As another example, 210 of process 200 can be performed by a first device and 220 of process 200 can be performed by a second device. The first device or the second device can be a merchant server or client software installed on a client, respectively.

According to various embodiments of the present application, a merchant server includes an order receiving system, a payment collecting system, a payment system, and a transaction scheduling module.

Figure 3:
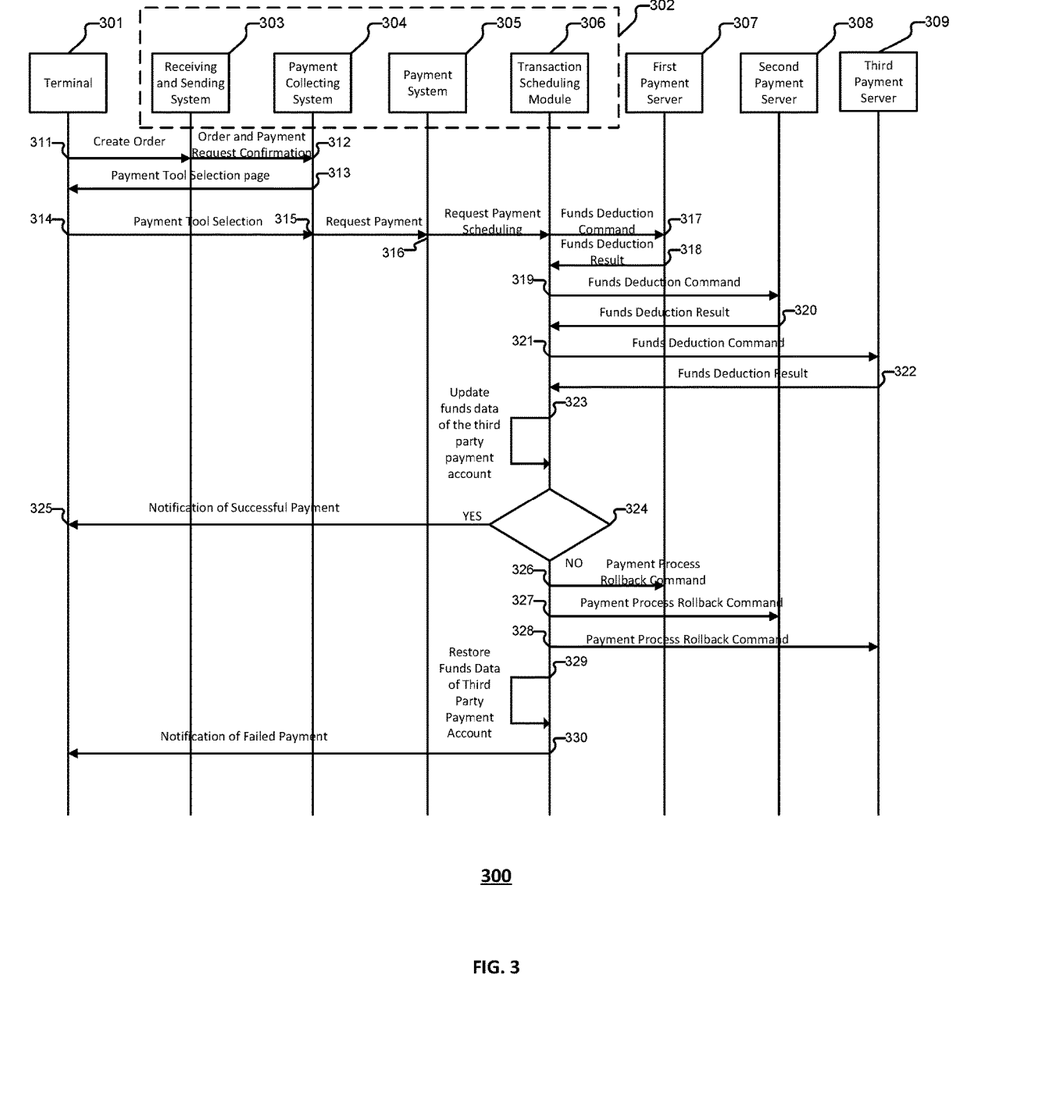
FIG. 3 is a flowchart of a method for operating electronic accounts according to various embodiments of the present application.

FIG. 3 is a flowchart of a method for operating electronic accounts according to various embodiments of the present application.

Referring to FIG. 3, a process 300 for operating electronic accounts is provided. Process 300 can be implemented using device 400 of FIG. 4.

Process 300 can include communication among a terminal (e.g., a user terminal) 301, a merchant server 302, a first payment server 307, a second payment server 308, and a third payment server 309. The merchant server 302 includes a receiving and sending system 303, a payment collecting system 304, a payment system 305, and a transaction scheduling module 306.

At 311, an order is created. The order can be created by the user providing an input to the terminal 301 to execute the terminal 301. The order receiving system receives a single electronic order created by the terminal 301. The order can be created in connection with a payment request. In response to the user creating the order, the terminal 301 can communicate the order or an indication of the order to the merchant server 302. The receiving and sending system 303 of the merchant server 302 can receive an indication of the order.

At 312, the payment collecting system confirms the electronic order and the payment request. The receiving and sending system 303 can send an order and payment request confirmation to the payment collecting system 304.

At 313, a payment tool selection page is communicated to the terminal 301. In response to receiving the order and payment request confirmation, the payment collecting system 304 can communicate the payment tool selection page to the terminal 301. The payment collecting system 304 can push the payment tool selection page to the terminal 301.

At 314, a selection of a payment tool is communicated. In response to receiving the payment tool selection page, the terminal 301 can provide the payment tool selection page to the user and receive an input corresponding to a selection of the payment tool to be used in connection with payment associated with the order. The terminal 301 can provide a payment amount associated with each payment tool. For example, a user can input to the terminal 301 the corresponding payment amounts. In response to receiving the selection of the payment tool at 314, the payment collecting system 304 can determine a result of the selection of the payment tool.

At 315, a request for payment is communicated. The payment collecting system 304 requests payment from the payment system 305. In connection with the request for payment, the payment collecting system 304 can send information on the selected payment tools and corresponding payment amount information. Assume for process 300 that three payment tools are selected by the user.

At 316, a request for payment scheduling is communicated. The payment system 305 can request payment scheduling from the transaction scheduling module 306. The payment system 305 can send information on the payment tools selected by the user and corresponding payment amount information in connection with the request for payment scheduling. The request for payment scheduling can be used in connection with ensuring that the payment tools (or the servers respectively associated therewith) are in the same state in relation to payment. In some embodiments, success of a payment in which a plurality of payment tools are being used requires that the payment tools be in the same state in relation to payment. The request for payment scheduling can be used to ensure that if any one of the transactions (e.g., funds deductions) using the payment tools fails, the overall payment of the order fails. Accordingly, the request for payment scheduling can include a request to roll back transactions (e.g., funds deductions) associated with the payment tools in the event that any one transaction (e.g., funds deduction) associated with any one payment tools fails. The request for scheduling can further include an indication that if the transactions (e.g., funds deduction) associated with all of the selected payment tools are successful, then the overall payment of the order is successful.

In response to receiving a request for payment scheduling, a funds deduction command can be communicated to the payment servers respectively corresponding to the selected payment tools.

At 317, a first funds deduction command is communicated to first payment server 307. The transaction scheduling module 306 can send the funds deduction command to the first payment server 307 corresponding to a selected payment tool.

At 318, in response to receiving the funds deduction command, the first payment server 307 executes the funds deduction command and sends a notification of the funds deduction result. The first payment server 307 sends the funds deduction result to the transaction scheduling module 306.

Upon receipt of a notification of successful funds deduction sent back from any of the payment servers, the funds data of the third party payment account is updated according to the corresponding payment amount. The merchant server 302 can update the funds data of the third party payment account according to the corresponding payment amount.

At 319, a second funds deduction command is communicated to second payment server 308. The transaction scheduling module 306 can send the funds deduction command to the second payment server 308 corresponding to a selected payment tool.

At 320, in response to receiving the funds deduction command, the second payment server 308 executes the funds deduction command and sends a notification of the funds deduction result. The second payment server 308 sends the funds deduction result to the transaction scheduling module 306.

At 321, a third funds deduction command is communicated to third payment server 309. The transaction scheduling module 306 can send the funds deduction command to the third payment server 309 corresponding to a selected payment tool.

At 322, in response to receiving the funds deduction command, the third payment server 309 executes the funds deduction command and sends a notification of the funds deduction result. The third payment server 309 sends the funds deduction result to the transaction scheduling module 306.

In some embodiments, the transaction scheduling module 306 can concurrently send the respective funds deduction commands of 317, 319, and 321. The respective funds deduction commands can be different. For example, a respective funds deduction command can include information relevant to the payment using the specific payment tool associated with the payment server to which the respective funds command is communicated and not information for another payment tool. In some embodiments, the respective funds deduction command can be the same. For example, the same information can be communicated to each of the first payment server 307, the second payment server 308, and the third payment server 309.

In some embodiments, 317, 319, and 321 are performed concurrently. Similarly, in some embodiments, 318, 320, and 322 are performed concurrently.

In some embodiments, in the event that the merchant server 302 does not receive a notification of successful funds deduction, then 323 need not be executed. Accordingly, process 300 can skip 318, 320, or 322 and execute 323. 318, 320, or 322 can be skipped if a notification of successful funds is not received within a threshold period of time.

At 323, the third party payment account is updated. The third party payment account can be updated by the transaction scheduling module 306. The third party payment account can be updated in response to receiving funds deduction results at 318, 320, and 322 in the event that the corresponding funds deduction results indicate that funds deduction is successful. In some embodiments, the third party payment account can be updated upon reception of each fund deduction result at 318, 320, and 322. For example, the third party payment account can be updated after receiving each fund deduction result if the fund deduction result indicates that the fund deduction was successful.

At 324, a determination is made as to whether a corresponding notification of successful deduction is received from all of the payment servers to which a funds deduction command was sent in connection with a particular order within a threshold period of time. For example, the transaction scheduling module 306 determines whether the first payment server 307, the second payment server 308, and the third payment server 309 have sent notifications of successful funds deduction within a threshold period of time. If the first payment server 307, the second payment server 308, and the third payment server 309 have sent notification of successful funds deduction within the threshold period of time, process 300 proceeds to 325. If any of the first payment server 307, the second payment server 308, and the third payment server 309 has not sent notification of successful funds deduction within the threshold period of time, process 300 proceeds to 326.

In some embodiments, the transaction scheduling module 306 can poll for messages (e.g., notification of successful funds deduction) from the first payment server 307, the second payment server 308, and the third payment server 309. For example, the transaction scheduling module 306 monitors the messages sent from the first payment server 307, the second payment server 308, and the third payment server 309 and performs the determination at 324 based on the monitoring results.

At 325, a notification of successful payment is sent to the terminal 301. The merchant server 302 can send the notification of successful payment to the terminal 301. For example, the transaction scheduling module 306 sends the notification of successful payment to the terminal.

If any of the first payment server 307, the second payment server 308, and the third payment server 309 have not sent notification of successful funds deduction within the threshold period of time, a payment process rollback command is communicated to each of the payment servers associated with the selected payment tools corresponding to a transaction.

At 326, a payment process rollback command is communicated to the first payment server 307.

At 327, a payment process rollback command is communicated to the second payment server 308.

At 328, a payment process rollback command is communicated to the third payment server 309.

At 329, in the event that a notification of successful funds deduction is received from one of the payment servers associated with a selected payment tool, the funds data of the third party payment account is restored. For example, upon determining that the funds data of the third party payment account has been updated according to a notification of successful funds deduction sent by any one of the payment servers, the funds data of the third party payment account is restored. The funds data of the third party payment account is restored if notification of successful funds deduction is received from one of the payment servers associated with a first selected payment tool and a notification of successful funds deduction is not received (or a notice of a failure of funds deduction is received) from another of the payment servers associated with a second selected payment tool.

If the funds data of the third party payment account has not been updated according to a notification of successful funds deduction, then 329 need not be executed, and process 300 can proceed to 330.

At 330, a notification of failed payment is sent to the terminal 301. The merchant server 302 sends the notification of failed payment to the terminal. For example, the transaction scheduling module 306 can send the notification of failed payment to the terminal. In response to receiving the notification of failed payment, the terminal can provide an indication of the failed payment to the user. For example, the indication can include displaying an indication on a screen, providing a vibration, providing the indication using a light, or the like.

A first payment tool, a second payment tool, and a third payment tool can be selected from any payment tool of any funds-providing institution linked to the merchant account. For example, the first payment tool, the second payment tool, and the third payment tool correspond to the balances of different bank cards, or correspond to the balance, the points, and the reward value of the same mobile phone account. In some embodiments, after the user creates (e.g., submits) an electronic order, the user selects the payment tools using the payment tool selection page, selects the corresponding payment amounts, and inputs any corresponding payment passwords. In the event that multiple payment tools have been selected, the various payment servers can process funds in parallel.

Figure 4:
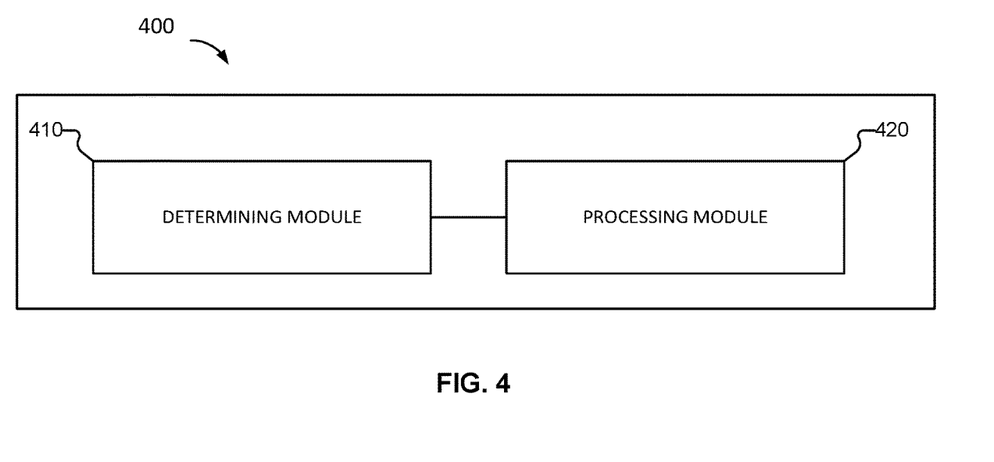
FIG. 4 is a diagram of a device for operating electronic accounts according to various embodiments of the present application.

FIG. 4 is a diagram of a device for operating electronic accounts according to various embodiments of the present application.

Referring to FIG. 4, a device 400 for operating electronic accounts is provided. Device 400 can implement process 200, process 250, or process 300. In some embodiments, device 400 corresponds to a merchant server. Device 400 includes a determining module 410 and a processing module 420.

The determining module 410 is configured to determine a result of a selection of a payment tool. A user can input to a terminal (e.g., a user terminal) a selection of a payment tool. The user can input the selection of the payment tool to an interface provided by the terminal. The terminal can send an indication of the selection of the payment tool to device 400. The determining module 410 determines the result of the selection of the payment tool based on the indication of the selection of the payment tool. The selection of the payment tool can correspond to a selection of a payment tool in connection with a single electronic order.

In some embodiments, the payment tool selection result information includes information on at least two payment tools. For example, the payment tool selection result information provides an indication of at least two payment tools that the user wants to use in connection with the electronic order.

The processing module 420 is configured to send a funds deduction command to the payment server corresponding to each selected payment tool. The processing module 420 can use the result of a selection of a payment tool as a basis for sending a funds deduction command to the payment server corresponding to each selected payment tool.

In the event that the selection of the payment tool includes selection of a first payment tool and a second payment tool, the processing module 420 communicates a command associated with a funds deduction to a payment server associated with the first payment tool and to a payment server associated with the second payment tool.

In some embodiments, device 400 includes a receiving and sending module (not shown) configured to communicate a payment tool selection page to the terminal (e.g., the user terminal) and to receive the selection of the payment tool sent by the terminal. The receiving and sending module can push the payment tool selection page to the terminal. The receiving and sending module can push the payment tool selection page to the terminal in connection with the terminal submitting an order (e.g., in response to receiving an indication that the terminal submitted an order).

In some embodiments, the processing module 420 is further configured to update the funds data in a third party account. The processing module 420 can update the funds data in a third party account in the event that a notification of successful funds deduction is received from any one of the payment servers associated with a selected payment tool. The funds data in the third party account can be updated until the funds data of the third party payment account has been updated according to the notification of successful funds deduction received from each one of the payment servers. The processing module 420 can be further configured to send a notification of successful payment to the terminal (e.g., the user terminal) after the funds data of the third party payment account is updated in connection with the receipt of the notification of successful funds deduction received from the payment servers associated with the selected payment tools. For example, after receiving the notification of successful funds deduction from each of the payment servers associated with the selected payment tools corresponding to a transaction (e.g., order), the notification of successful payment is sent to the terminal.

In some embodiments, the processing module 420 is further configured to send a payment process rollback command to the payment server of each of the selected payment tools. The processing module 420 can send the payment process rollback command in response to receiving a notification of failed funds deduction from any one of the payment servers associated with the selected payment tools. The processing module 420 can be further configured to send a notification of failed funds deduction to the terminal. For example, in response to receiving a notification of failed funds deduction from any one of the payment servers associated with the selected payment tools (and sending the payment process rollback command), the processing module 420 can send the notification of failed funds deduction to the terminal. The processing module 420 can determine whether the funds data of the third party payment account has been updated according to a notification of a successful funds deduction message sent back by any one of the payment servers associated with the selected payment tools. In response to determining that the third party payment account has been updated, the processing module 420 restores the funds data of the third party payment account.

In some embodiments, the processing module 420 is further configured to send a payment process rollback command to the payment server associated with the selected payment tools. For example, in the event that no notification of successful funds deduction is sent from any one of the payment servers within a threshold period of time, the processing module 420 sends a payment process rollback command to the payment server of each of the selected payment tools. The processing module 420 can be configured to send a notification of failed funds deduction to the terminal. For example, in the event that no notification of successful funds deduction is sent from any one of the payment servers within a threshold period of time, the processing module 420 can send a notification of failed funds deduction to the terminal. The processing module 420 can be configured to restore the funds data of the third party payment account. For example, the processing module 420 can determine whether the funds data of the third party payment account has been updated according to a notification of a successful funds deduction message sent back by any one of the payment servers associated with a selected payment tool, and restore the funds data of the third party payment account in the event that the processing module 420 determines that the funds data of the third party payment account has been updated according to a notification of a successful funds deduction message sent back by any one of the payment servers associated with a selected payment tool and in the event that no notification of successful funds deduction is sent from any one of the payment servers within a threshold period of time.

In some embodiments, the payment process rollback command comprises a reverse operation request command or a refund operation request command.

In some embodiments, the selection of the payment tool also includes payment amount information corresponding to each payment tool. The payment amount information corresponding to each payment tool can represent the amount that is to be paid using the particular payment tool.

In some embodiments, the information associated with at least two payment tools can be acquired through a one-time acquisition of payment tool selection result information. Accordingly, payment operating time is saved and payment efficiency and convenience for electronic orders are increased.

Figure 5:
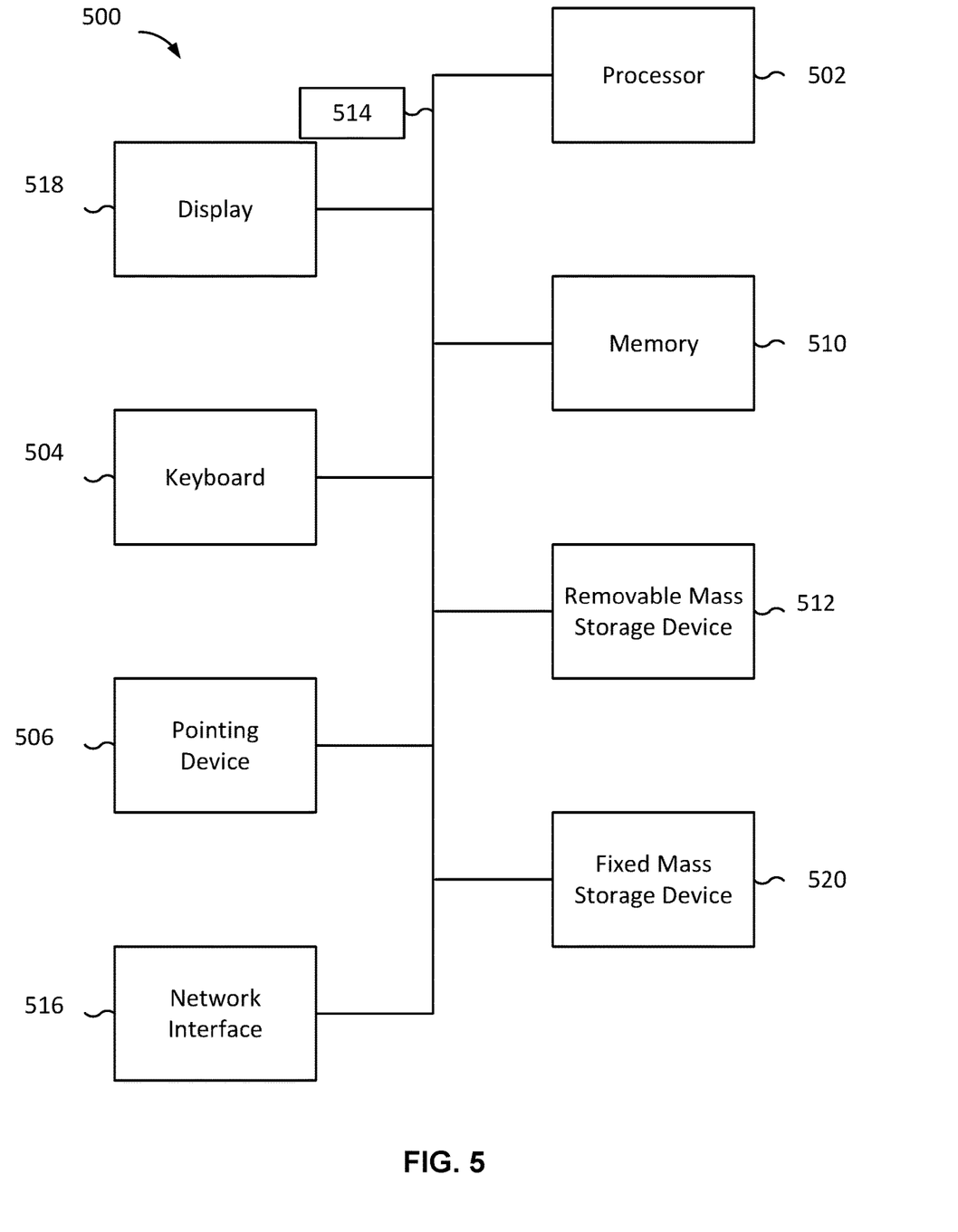
FIG. 5 is a functional diagram of a computer system for operating electronic accounts according to various embodiments of the present application.

FIG. 5 is a functional diagram of a computer system for operating electronic accounts according to various embodiments of the present application.

Referring to FIG. 5, a computer system 500 for operating electronic accounts is provided. As will be apparent, other computer system architectures and configurations can be used to operate electronic accounts. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data, and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown). The memory can be a non-transitory computer-readable storage medium.

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage device 512 and fixed mass storage 520 generally store additional programming instructions, data, and the like that typically are not in active use by the processor 502. It will be appreciated that the information retained within mass storage device 512 and fixed mass storage 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

The above are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   providing, by one or more processors, a payment tool selection page to a terminal, wherein the providing the payment tool selection page comprises pushing the payment tool selection page to the terminal;
   receiving, by the one or more processors associated with one or more servers, an indication that a plurality of payment tools is to be used for payment in connection with online order, wherein:
      the indication is received from the terminal; and
      a selection of the plurality of payment tools is received in connection with a submission to the payment tool selection page;
   sending, by the one or more processors, one or more funds deduction commands to a plurality of payment servers associated with corresponding ones of the plurality of payment tools;
   in response to a determination that a funds deduction is unsuccessful at one or more of the plurality of payment servers, causing a funds deduction to be rolled back for at least one of the plurality of payment servers for which the corresponding funds deduction is determined to be successful; and
   in response to a determination that the funds deduction is successful at the plurality of payment servers, causing payment for the online order to be completed.

2. The method of claim 1, further comprising:
   receiving, by the one or more processors, one or more notifications of successful funds deduction from any of the plurality of payment servers associated with the selected payment tools; and
   in response to receiving the one or more notifications of successful funds deduction, updating, by the one or more processors, funds data in a third party payment account.

3. The method of claim 2, wherein the updating of the funds data in the third party payment account comprises updating the funds data in the third party payment account for each of the one or more notifications of a successful funds deduction received from the plurality of payment servers.

4. The method of claim 1, further comprising:
   in response to a determination that funds data in a third party payment account is updated, sending a notification of successful payment to the terminal.

5. The method of claim 4, wherein the notification of successful payment pertains to successful payment from a corresponding one of the plurality of payment servers.

6. The method of claim 4, wherein the notification of successful payment is sent to the terminal in response to a determination that a notification of successful funds deduction is received for each of the selected payment tools.

7. The method of claim 1, wherein the causing the funds deduction to be rolled back comprises:
   causing a deduction command to be reversed at each of the plurality of servers for which the corresponding funds deduction is determined to be successful; and
   causing a third party account to be updated to reverse a plurality of updates to the third party account, the plurality of updates to be reversed corresponding to successful funds deductions at the plurality of servers for which the corresponding funds deduction is determined to be successful.

8. The method of claim 1, further comprising:
   receiving a notification of failed funds deduction from any of the plurality of payment servers; and
   in response to receiving the notification of failed funds deduction, sending a notification of failed payment to the terminal,
   wherein the causing the funds deduction to be rolled back comprises:
      sending a payment process rollback command to the at least one of the plurality of payment servers;
      determining whether funds data of a third party payment account has been updated in response to receiving a notification of successful funds deduction from any of the plurality of payment servers; and in response to determining that the funds data of the third party payment account has been updated, restoring the funds data of the third party payment account.

9. The method of claim 8, wherein the payment process rollback command comprises a reverse operation request command or a refund operation request command.

10. The method of claim 1, further comprising:
in response to a determination that a notification of successful funds deduction is not received from any of the plurality of payment servers within a threshold period of time, determining that the funds deduction is unsuccessful at the one or more of the plurality of payment servers, and sending a notification of failed payment to the terminal,
wherein the causing the funds deduction to be rolled back comprises:
sending a payment process rollback command to the payment servers associated with corresponding ones of the selected payment tools;
determining whether funds data of a third party payment account has been updated in response to receiving a notification of successful funds deduction from any of the plurality of payment servers; and
in response to determining that the funds data of the third party payment account has been updated, restoring the funds data of the third party payment account.

11. The method of claim 1, wherein the receiving the indication that the plurality of payment tools is to be used in connection with the online order comprises:
receiving a selection of the plurality of payment tools.

12. The method of claim 11, wherein the selection of the plurality of payment tools corresponding to an input to a payment tool selection page to the terminal.

13. The method as described in claim 11, wherein:
payment amount information corresponding to each selected payment tool in connection is received with the receiving of the selection of the plurality of payment tools.

14. The method of claim 11, wherein the plurality of payment servers is determined based at least in response to the selection of the plurality of payment tools and a mapping of payment servers to payment tools.

15. A device, comprising:
at least one processor configured to:
provide a payment tool selection page to a terminal, wherein to provide the payment tool selection page comprises pushing the payment tool selection page to the terminal;
receive an indication that a plurality of payment tools are to be used for payment in connection with online order, wherein:
the indication is received from the terminal; and
a selection of the plurality of payment tools is received in connection with a submission to the payment tool selection page;
send one or more funds deduction commands to a plurality of payment servers associated with corresponding ones of the plurality of payment tools;
in response to a determination that a funds deduction is unsuccessful at one or more of the plurality of payment servers, cause a funds deduction to be rolled back for at least one of the plurality of payment servers for which the corresponding funds deduction is determined to be successful; and
in response to a determination that the funds deduction is successful at the plurality of payment servers, cause payment for the online order to be completed; and
a memory coupled to the at least one processor and configured to provide the at least one processor with instructions.

16. A computer program product, the computer program product being embodied in a non-transitory computer readable storage medium and comprising computer instructions for:
providing, by one or more processors, a payment tool selection page to a terminal, wherein the providing the payment tool selection page comprises pushing the payment tool selection page to the terminal;
receiving, by the one or more processors associated with one or more servers, an indication that a plurality of payment tools is to be used for payment in connection with online order, wherein:
the indication is received from the terminal; and
a selection of the plurality of payment tools is received in connection with a submission to the payment tool selection page;
sending, by the one or more processors, one or more funds deduction commands to a plurality of payment servers associated with corresponding ones of the plurality of payment tools;
in response to a determination that a funds deduction is unsuccessful at one or more of the plurality of payment servers, causing a funds deduction to be rolled back for at least one of the plurality of payment servers for which the corresponding funds deduction is determined to be successful; and
in response to a determination that the funds deduction is successful at the plurality of payment servers, causing payment for the online order to be completed.

* * * * *

UNITED STATES PATENT AND TRADEMARK OFFICE
CERTIFICATE OF CORRECTION

PATENT NO. : 10,916,160 B2  
APPLICATION NO. : 16/400240  
DATED : February 9, 2021  
INVENTOR(S) : Jianwei Jin Page 1 of 1

It is certified that error appears in the above-identified patent and that said Letters Patent is hereby corrected as shown below:

On the Title Page

Item (73), assignee, address, after "Advanced New Technologies Co., Ltd.", insert -- (KY) --.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*